L. R. GALLEY.
NUT LOCK.
APPLICATION FILED NOV. 3, 1914.

1,161,651. Patented Nov. 23, 1915.

Witnesses
R. Bidwell
J. P. Campbell

Inventor
Leonard R. Galley,
By Richard Owen,
Attorney

UNITED STATES PATENT OFFICE.

LEONARD R. GALLEY, OF BERNARD, MAINE.

NUT-LOCK.

1,161,651.  Specification of Letters Patent.  Patented Nov. 23, 1915.

Application filed November 3, 1914. Serial No. 870,097.

*To all whom it may concern:*

Be it known that I, LEONARD R. GALLEY, a citizen of the United States, residing at Bernard, in the county of Hancock and State of Maine, have invented certain new and useful Improvements in Nut-Locks, of which the following is a specification.

My invention relates to new and useful improvements in nut locks.

The primary object of the invention is the provision of a nut lock which may be attached to any threaded object for preventing the nut from working loose therefrom.

A further object of the invention is the construction of a nut lock which is adapted to be used with the nut now commonly in use and in which it is unnecessary to have a nut or bolt of special formation.

Figure 1:
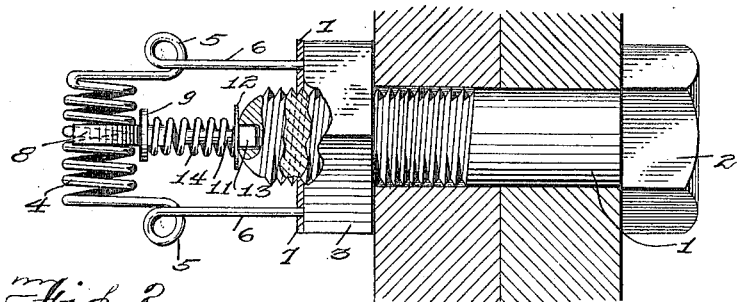
Figure 2:
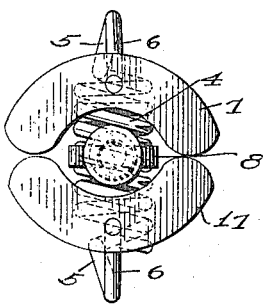
Figure 3:
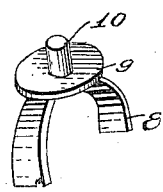
Figure 4:
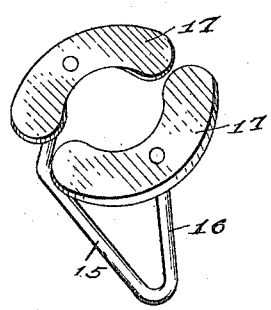

With these and other objects in view the invention consists in the novel details of construction and arrangement of parts which will be more clearly understood from the following description and drawings, in which, Figure 1 is a side view partly in section showing the device applied. Fig. 2 is a front view of the lock. Fig. 3 is a detail of that part of the auxiliary locking member which engages the primary locking member, and Fig. 4 is a perspective view of a slightly modified form of the invention.

In the drawings, the numeral 1 indicates a threaded bolt of ordinary construction having the head 2 on one end thereof and preferably formed with a recess in the opposite end. A nut 3 of ordinary construction is adapted to be received on the threaded bolt 1 in the usual manner.

The locking member is preferably formed from a single strip of wire bent to form the coil 4, the eye members 5 and arms 6 to which are attached the plates 7 having the edges curved, as shown, and adapted to conform to the curvature of the bolt. The plates 7 have the curved edges beveled whereby they will easily engage the threads of the bolt. When in position the plates 7 engage the outer face of the nut 3 and prevent the nut from working loose from the bolt. It will be seen that the plates tightly engage the bolt through means of the coil 4 and looped eye members 5.

An auxiliary locking member is provided consisting of a curved plate 8 having a collar 9 and projection 10 formed thereon. A plunger 11 is provided with a collar 12 and an enlarged head 13 which is adapted to enter the recess in the end of the bolt and a coil spring 14 surrounds the projection 10 and plunger 11 between the collars 9 and 12. The plate 8 engages the coil 4, as clearly shown in Fig. 1 of the drawings, and the enlarged head 13 enters the recess in the end of the bolt with the spring 14 forcing the plunger and head in the bolt and at the same time tightly holding the plate 8 in engagement with the coil 4. It will thus be seen that the auxiliary locking means more securely holds the plates 7 in position as it has a tendency to press the plates toward the end of the bolt, thereby securely gripping the threads.

In Fig. 4 of the drawings I have shown a slightly modified form of the invention which merely consists of a wire bent to form the cross bar 15 and arms 16 and plates 17 are secured on the ends of the rods. It will thus be seen that this lock may be used in the same manner as the preferred form of the invention and may be used either with or without the auxiliary locking member.

I desire it clearly understood that both the preferred form and modified form of the invention may be used without the auxiliary locking member and when used without the auxiliary locking member it will not be necessary to have a recess formed in the end of the bolt. By having the plates engaging the threads, as shown and described, as well as the outer face of the nut the nut is prevented from working loose from the bolt.

Having fully described the invention what I claim as new and desire to secure by Letters Patent is:—

1. In a nut lock, the combination with a threaded bolt, of plates having curved and beveled edges adapted to engage the bolt, and means for resiliently connecting the plates.

2. In a nut lock, the combination with a threaded bolt, of spring arms formed from a single strip of wire bent to form eyes, and plates secured to the arms and adapted to engage the bolt.

3. In a nut lock, the combination with a threaded bolt, of spring arms formed from a single strip of wire bent to form a coil connecting the arms, and plates secured to the arms and engaging the bolt.

4. In a nut lock, the combination with a threaded bolt, of spring arms bent to form eyes, a coil connecting the arms, and plates secured to the arms and adapted to engage the bolt.

5. In a nut lock, the combination with a threaded bolt, of plates adapted to engage the bolt, resilient means connecting the plates, plungers engaging the end of the bolt and resilient connecting means and means for resiliently connecting the plungers.

6. In a nut lock, the combination with a threaded bolt, of plates adapted to engage the bolt, resilient means connecting the plates, and a resilient member engaging the end of the bolt and resilient connecting means.

7. In a nut lock, the combination with a threaded bolt, of plates adapted to engage the bolt, means for connecting the plates, a member engaging the connecting means, a plunger adapted to engage the end of the bolt, and a spring engaging the plunger and member engaging the connecting means.

8. In a nut lock, the combination with a threaded bolt, of arms having plates secured thereto and adapted to engage the bolt, a coiled member connecting the arms, a curved plate engaging the coiled connecting member, a plunger adapted to engage the end of the bolt, and a spring engaging the curved plate and plunger.

9. In a nut lock, the combination with a threaded bolt, of arms having plates secured on the ends thereof and adapted to engage the bolt, a wire coil connecting the arms, a curved plate engaging the coil and provided with a collar, a plunger adapted to engage the end of the bolt and provided with a collar, and a coil spring received between the collars on the plunger and curved plate.

In testimony whereof I affix my signature in presence of two witnesses.

LEONARD R. GALLEY.

Witnesses:
  EBEN B. CLARK,
  SHIRLEY H. GALLEY.

Copies of this patent may be obtained for five cents each, by addressing the "Commissioner of Patents. Washington, D. C."